(12) United States Patent
Fujisawa et al.

(10) Patent No.: US 6,734,583 B2
(45) Date of Patent: May 11, 2004

(54) SLIDER UNIT WITH BUILT-IN MOVING-COIL LINEAR MOTOR

(75) Inventors: Shoji Fujisawa, Kanagawa-ken (JP); Tsutomu Togashi, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 14 days.

(21) Appl. No.: 09/931,850

(22) Filed: Aug. 20, 2001

(65) Prior Publication Data

US 2002/0021050 A1 Feb. 21, 2002

(30) Foreign Application Priority Data

Aug. 21, 2000 (JP) .......................... 2000/249951

(51) Int. Cl.[7] .............................................. H02K 41/00
(52) U.S. Cl. ........................................................ 310/12
(58) Field of Search .............................. 310/12, 13, 14

(56) References Cited

U.S. PATENT DOCUMENTS

| 4,318,038 | A | * | 3/1982 | Munehiro | 318/135 |
|---|---|---|---|---|---|
| 4,607,355 | A | * | 8/1986 | Koide | 369/44.29 |
| 4,689,529 | A | * | 8/1987 | Higuichi | 318/135 |
| 5,571,284 | A | * | 11/1996 | Kawamichi et al. | 400/322 |
| 5,770,899 | A | * | 6/1998 | Hayashi | 310/12 |
| 5,962,937 | A | * | 10/1999 | Wavre | 310/12 |
| 5,998,889 | A | * | 12/1999 | Novak | 310/12 |
| 6,163,091 | A | * | 12/2000 | Wasson et al. | 310/13 |
| 6,348,746 | B1 | * | 2/2002 | Fujisawa et al. | 310/12 |
| 6,353,271 | B1 | * | 3/2002 | Williams | 310/12 |

FOREIGN PATENT DOCUMENTS

| JP | 359006767 A | * | 1/1984 |
|---|---|---|---|
| JP | 254682/1987 A | | 11/1987 |
| JP | 406319250 A | * | 11/1994 |
| JP | 107728/1995 A | | 4/1995 |
| JP | 49099/1983 B2 | | 11/1999 |
| JP | 333435/2000 A | | 11/2000 |

\* cited by examiner

Primary Examiner—Burton S. Mullins
Assistant Examiner—Judson H. Jones
(74) Attorney, Agent, or Firm—Browdy and Neimark, P.L.L.C.

(57) ABSTRACT

A slider unit having built in a moving-coil linear motor ensuring high propulsion, is kept slim in overall height. A moving-coil assembly is made slim, with high stiffness, and is composed of an iron core of platy-configuration, and at least one set of three-phase armature coils wound around the iron core in the form of flat rectangular configuration in a plane intersecting the sliding direction. Comparatively more coil sides of the armature coils contribute to high propulsion. Like poles on either field magnet are placed in opposition to each other across the air gap, whereby the magnetic attraction is cancelled to reduce the load on the linear motion guide unit.

2 Claims, 8 Drawing Sheets

SLIDER UNIT WITH BUILT-IN MOVING-COIL LINEAR MOTOR

BACKGROUND OF THE INVENTION

1. Field of the Invention

The present invention relates to a slider unit with a built-in moving-coil linear motor, which has been extensively used in semiconductor and liquid crystal display industries, measuring instruments, assembling machines, machine tools, industrial robots, conveyors and others. More particular, the present invention relates to a slider unit with a built-in moving-coil linear motor of the type in which an exciting coil is installed in the side of moving element.

2. Description of the Prior Art

In recent years, multi-axis stages and moving mechanisms such as X-Y plotters employed in the diverse technical fields as stated just above have required more and more a slider unit, which is compact or slim in construction and light in weight, and moreover able to operate with high propulsion, high speed and high response to provide high speed travel and accurate position control for works, tools, articles and instruments. Linear motors commonly used in the slider units involve two broad types. The first, called moving-magnet linear motor has a stator of an armature coil arranged lengthwise over the entire length of a bed of stationary part, and a moving-field magnet of permanent magnet arranged on a table movable in a sliding manner along the length of the bed. The second, called moving-coil linear motor has a stator of field magnet mounted on the bed, and moving-armature coils distributed in space one after another on the table such that they are a preselected electrical angle out of phase.

A moving-coil linear motor is disclosed in Japanese Patent Publication No. 49099/1983. As shown in FIGS. 1 and 2 in the Japanese publication recited earlier, the prior linear motor has flat permanent-magnet pieces that are each magnetized in thickness-wise direction. The permanent magnets are arranged such that the poles on either magnet alternate lengthwise in polarity along a traveling direction of a moving element while like poles are placed in opposition to each other across the traveling direction of the moving element. A center yoke is arranged between confronting like poles in such a relation as to oppose the permanent-magnet pieces. The moving coil is composed of two winding parts each of which has a length half the width of the permanent-magnet piece, the two winding parts being arranged on a coil bobbin fit in the center yoke. Thus, the moving coil is allowed to move in a clearance defined between the permanent magnets and the center yoke.

Another example of the prior moving-coil linear d-c motor is disclosed in Japanese Patent Laid-Open No. 254682/1987. The prior moving-coil linear d-c motor, as seen from FIGS. 1 and 2 in the publication cited above, is the same found in Japanese Patent Publication No. 49099/1983, other than the moving part of coils composed of more than one set of three-phase coil.

Japanese Patent Laid-Open No. 107728/1995 discloses a linear d-c motor to drive an X-Y table, in which the stationary side is composed of a yoke of roughly U-shaped configuration in cross section and a permanent magnet secured on a bottom of the yoke, while a moving side is supported on the stationary side for lengthwise reciprocation and composed of an iron core encircled with coils, and a pair of magnetic members attached to fore-and aft ends of the iron core.

Referring now to FIGS. 11 and 12, there is shown a prior slide unit with a built-in moving-coil linear motor disclosed in Japanese Patent Laid-Open No. 333435/2000, which is co-pending senior application. In the accompanying drawings, FIG. 11 is a perspective view showing the slide unit having a built-in moving-coil linear motor, while FIG. 12 is an illustration to explain how the linear motor operates to drive the slider unit.

A slider unit 70 is of an elongated structure made reduced in the overall height and mainly comprised of a bed 2 for a base member mounted to any one, ordinarily stationary side, not shown, of relatively movable parts by means of screws fit in fixing holes 4, and a table 10 on which is mounted a counterpart, ordinarily a work, not shown, of the relatively movable parts. The bed 2 has a shallow U-shape, when viewed in cross section traversing the moving direction of the table 10, which is composed of an elongated bottom 2b and upright walls 2a arranged at widthwise opposing edges of the bottom 2b. A pair of track rails 3 is arranged lengthwise of the bed 2 in parallel with each other at a height identical with each other and fixed to the bed 2 with machine screws 17. The table 10 is secured by machine screws 46 onto more than one sliding element 11 that rides on the elongated track rails 3 for sliding movement. A moving-coil linear motor 20 inboard the slider unit 70 is comprised of a magnet yoke 21 having an U-shaped configuration in cross section, a pair of field magnets 30, 31 attached to the magnet yoke 21, and a moving-coil assembly 40 supported on the table 10.

Attached on lengthwise opposing ends of the bed 2 are end blocks 5, one to each end, to define a tolerable stroke range where the table 10 is allowed to move along the track rails 3. Recesses 7 opened downwards are formed at the outermost end faces 5a of the end blocks 5. An operator may easily lift or carry the slider unit 70 by putting his hands on the recesses 7. Stoppers 8 of elastic body such as urethane rubber are attached to inside surfaces 5b of the end blocks 5, one to each end block, to provide buffers for protecting the table 10 from a collision against the end blocks 5 when the sliding element 11 comes close to the limit of its stroke. Limiters, although not shown, are arranged on the lengthwise opposing ends of the bed 2 and fixed to the bed 2 with machine screws 19, while the table 10 has detecting means to sense the limiters when approaching any one of the opposing ends of the bed 2.

The table 10, while secured by machine screws 46 onto more than one sliding element 11, is made with many threaded holes 12, four holes shown in figures, for fixing a work. The sliding element 11 constitutes, in combination with the track rails 3, for example a small linear motion guide unit 16 in which rolling elements are allowed to run through recirculating passage including raceways defined between the confronting surfaces of the rack rails 3 and the sliding elements 11, and turnarounds and return passages in the sliding elements 11.

The table 10 is allowed to move lengthwise of the bed 2 with respect to the bed 2 by virtue of the small linear motion guide units 16. Both the bed 2 and the table are made of aluminum alloys to reduce in weight the slider unit 70, improving the acceleration performance, and realizing high speed and high responsibility.

A linear motor 20 drives the table 10 along the bed 2. The moving-coil assembly 40 is supplied with electric power through a power line. Signals representing the positions of the table 10 with respect to the bed 2 are applied to an external controller where the electric power supplied through the power line is regulated, depending on information as to the positions applied via the sensor cord.

The moving-coil linear motor 20 inboard the slider unit 70 includes a magnet yoke 21 of U-shape in cross section perpendicular to the moving direction of the table 10 to support the field magnets 30, 31 thereon. The magnet yoke 21 will be considered a stator part of the moving-coil linear motor 20, which extends lengthwise over the entire length of the bed 2 and is mounted to the bed 2. The magnet yoke 21 is composed of an upper web 22 and a lower web 23, which are arranged in opposing relation to each other to provide an elongated gap 32 between them, and a connecting web 24 interconnecting integrally the confronting upper and lower webs 22, 23 at any one side of widthwise opposing edges. The magnet yoke 21, although made thin in thickness and slim in construction, may be kept high in its overall stiffness to be less subject to the deflection owing to the magnetic attraction over a tolerable minor extent where no trouble might take place in operation of the linear motor. The magnet yoke 21 is fixed to the bed 2 by tightening more than one screw 25 through the connecting web 24 into the bed 2. The magnet yoke 21 is also provided with a sidewise opening 32a between the confronting upper and lower webs 22, 23 at another side of the widthwise opposing edges.

The field magnets 30, 31 in the form of sheet are arranged on the inwardly opposing surfaces: lower surface 27 and upper surface 28 of the confronting webs 22, 23, one to each surface. The field magnets 30, 31 are composed of thin magnet pieces 30a, 30b, 30c, 30d . . . and 31a, 31b, 31c, 31d . . . , which are magnetized such that the poles on either piece alternate in polarity lengthwise of the bed 2 or in the direction along which the table 2 slides. The magnet pieces 30a, 30b, 30c, 30d . . . and 31a, 31b, 31c, 31d . . . are closely placed side by side such that unlike poles oppose directly to each other across an air gap 32. The magnet pieces are each made of thin rectangular piece magnetized thickness-wise. An unlike pole pitch spanned between adjacent magnet pieces of unlike poles along the lengthwise direction of the bed 2 is identical with the width of magnetic pole of either magnet piece, which is measured in the lengthwise direction of the bed 2.

The moving-coil assembly 40 is arranged to extend in the air gap 32 through the sidewise opening 32a of the magnet yoke 21 of U-shape in cross section, and supported to the bed 2. The armature coils 42 made in the form of flat three-phase coreless coils of rectangular shape are arranged on any even surface in juxtaposition along the sliding direction of the table in such a relation that three armature coils are allotted to four pole width of the field magnets 30, 31 to provide a so-called four-pole, three-coil construction.

Modern advanced slider units need a further high propulsion performance. Increasing a number of the armature coils to cope with this raises a major problem of rendering the overall length of the moving-coil assembly large. As a result, the table enlarges in fore-and-aft length and, therefore the slide unit is made shorter in its tolerable stroke. For seeking to ensure the stroke length comparable with the slide units ever used, the bed must be much extended so that the slider unit will inevitably become much bulky.

To deal with the problem stated earlier, the moving-coil d-c linear motor as disclosed in Japanese Patent Laid-Open No. 254682/1987 has been developed, in which coils are arranged perpendicularly to the sliding direction to form bobbins, which are then arranged side by side on a center yoke for sliding movement. According to the motor construction stated just above, much armature coils are allotted to one pole width of the field magnet, and correspondingly the coil sides in the armature coils contributing to thrust production increase in number so as to realize high propulsion. With the moving-coil linear motor constructed as stated earlier, nevertheless, the motor large in the length of stroke needs the center yoke that is also too large in length, so that the center yoke is liable to deflection, which might cause the interference of the center yoke with the bobbins, thus obstructing the sliding movement of the table. Moreover, the center yoke, as heavy in weight, is unfit for the long slider unit.

With the slider unit having the bed supporting a magnet yoke thereon and the table arranged for sliding movement relatively to the bed, in which a current in the armature coils supported on the table to be disposed in an clearance between the confronting field magnets will interact with the magnetic flux developed by the field magnets installed on the confronting inside surfaces of the magnet yoke to force the table relatively to the bed, it is desirable to develop the improved slider unit that will realize high propulsion for moving the table at high speed and also allow highly accurate speed and position control of the table, with even keeping the construction slim in thickness as with the slider unit ever used.

SUMMARY OF THE INVENTION

The present invention, therefore, has as its primary object to overcome the major problem as described just above and more particular to provide a slider unit with a built-in moving-coil linear motor to drive a table with respect to a bed, in which the moving-coil linear motor inboard the slider unit is made slim in construction so as to reduce the overall height of the slider unit, whereby the slider unit allows providing a high propulsion, with even keeping the dimensions equivalent to the slider unit ever used.

The present invention is concerned with a slider unit with a built-in moving-coil linear motor, comprising a bed supporting thereon a magnet yoke, a table movable in a sliding manner with respect to the bed, a pair of field magnets arranged on inwardly facing surfaces of confronting sections of the magnet yoke in such a manner that poles on the field magnets alternate in polarity along a moving direction of the table and also like poles confront each other across an air gap between the field magnets, and a moving-coil assembly mounted to the table to lie in the air gap between the confronting field magnets, wherein the moving-coil assembly is composed of an iron core of platy-configuration extending in the air gap along the moving direction, and at least one set of three-phase armature coils wound in a direction intersecting the moving direction, whereby a current in the armature coils interacts electromagnetically with a field flux created by the field magnets to force the table moving with respect to the bed.

In one aspect of the present invention, there is disclosed a slider unit with a built-in moving-coil linear motor in which the confronting sections of the magnet yoke is connected to each other along any one side of widthwise opposing sides thereof.

In another aspect of the present invention, there is disclosed a slider unit with a built-in moving-coil linear motor in which the table is arranged for a sliding movement with respect to the bed through a linear motion guide unit, which is comprised of a guide rail mounted to the bed, and a sliding element fixed to the table.

In a further another aspect of the present invention, there is disclosed a slider unit with a built-in moving-coil linear motor in which the moving-coil assembly is supported by arms extending from the table through a sidewise opening left at another side of the confronting sections of the magnet yoke.

With the slider unit constructed as stated earlier, since the moving-coil assembly is composed of an iron core of platy-configuration, and at least one set of three-phase armature coils wound around the iron core in the form of flat rectangular configuration in a plane intersecting the sliding direction, the slider unit itself may be made slim or compact in construction, with even longer stroke range in which the table is allowed moving. Moreover, there are provided much coil sides of the armature coils contributing to the propulsion and, therefore the high propulsion may be realized.

The construction in which like poles on either field magnet are placed in opposition to each other across the air gap, as opposed to the prior slider units in which unlike poles on either field magnet are in opposition to each other, allows canceling the magnetic attraction thereby to reduce the load on the linear motion guide unit, so that the table allowed withstanding much load capacity. In addition, the armature coils of the present invention, as wound around the iron core high in stiffness, will withstand well against the high propulsion occurring in the armature coils to act on the moving-coil assembly.

In another aspect of the present invention, there is disclosed a slider unit with a built-in moving-coil linear motor in which the moving-coil assembly is composed of more than one set of armature coils and each set of armature coils corresponds to one pole width. The moving-coil assembly constructed as stated just above will succeed in keeping stable the propulsion acting on the moving-coil assembly.

In another aspect of the present invention, there is disclosed a slider unit with a built-in moving-coil linear motor in which the iron core is formed in a rectangular platy-configuration in cross section and made longer than an overall length of the armature coil, but set at a length roughly equivalent to a summation of several times the pole width in the field magnets and a half the pole width, and further the iron core is fixed at its fore-and-aft ends to the arms. The iron core constructed as stated above is different in phase of magnetic flux acting on any one end from on another end, thus contributing to eliminating cogging or variations in sliding movement.

In another aspect of the present invention, there is disclosed a slider unit with a built-in moving-coil linear motor in which any adjoining poles of field magnets are chamfered off at their corners coming into abutment against each other and facing the air gap. The field magnets constructed as stated earlier serve well for relaxing any adjoining field strength, thus providing the ideal distribution of magnetic flux strength to realize a smooth movement of the table.

In a further another aspect of the present invention, there is disclosed a slider unit with a built-in moving-coil linear motor in which the iron core is made of a lamination of thin steel sheets overlaid one on another. The iron core constructed as stated just above serves well to suppress the generation of eddy current in the iron core to be kept from becoming heated.

DETAILED DESCRIPTION OF THE PREFERRED EMBODIMENTS

Figure 11:
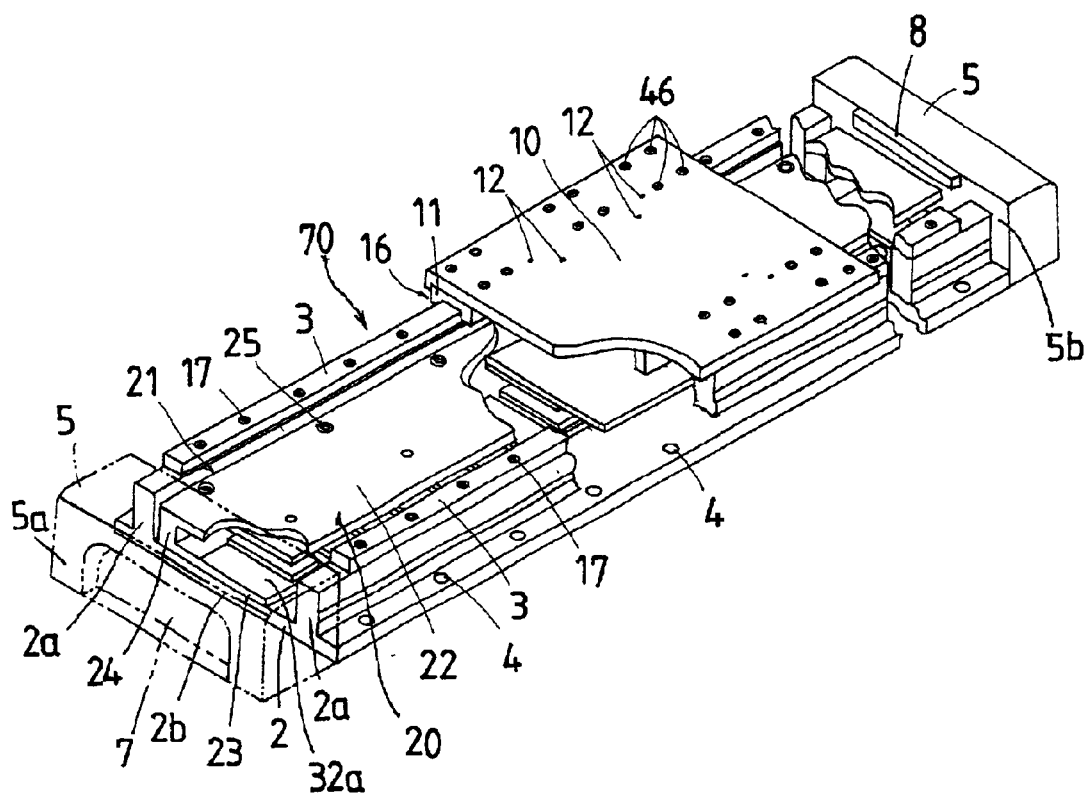
FIG. 11 is a perspective view, partially broken away, showing a conventional slider unit with built-in moving-coil linear motor.
Figure 12:
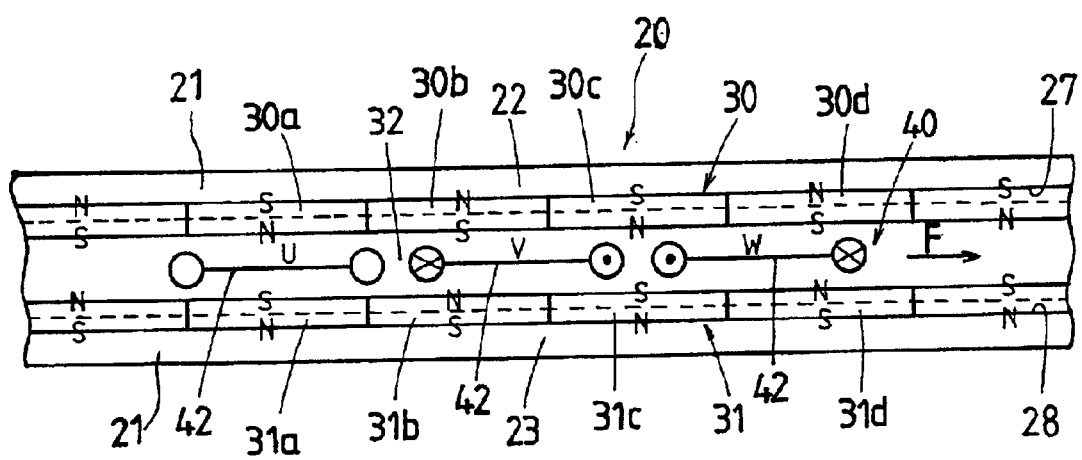
FIG. 12 is an illustration to explain how the moving-coil linear motor inboard the prior slider unit of FIG. 11 operates.

Preferred embodiments of a slider unit with a built-in moving-coil linear motor according to the present invention will be explained hereinafter in detail with reference to the accompanying drawings. Components and parts identical in function with that previously described in the prior slider unit of FIGS. 11 and 12 are given the same reference characters.

Referring now to FIGS. 1 to 4 showing the first preferred embodiment of the present invention, a slider unit 1 with a built-in moving-coil linear motor is mainly comprised of an elongated bed 2 formed in a rectangular shape in top plan view and made of aluminum alloys, a linear motion guide unit 16 composed of a pair of track rails 3 arranged lengthwise of the bed 2 in parallel with each other at a height identical with each other and a sliding element 11 riding astride any one of the paired track rails 3 for sliding movement, and a flat table 10 of rectangular shape made of aluminum alloys and fixed to the table 10.

The bed 2 is made with holes 4 in which fixing bolts fit to mount the bed 2 onto any one, for example a basement and so on, of relatively movable parts. In contrast, the table 10 is a counterpart of the relatively movable parts and is made with threaded holes 12 open upwards, into which fixing screws are screwed to secure any work to be moved towards any desired position with respect to the stationary part. The sliding element 11 movable along the associated track rail 3 is secured to the table 10 by driving fixing screws 46 into threaded holes made in the table 10.

Attached on lengthwise opposing ends of the bed 2 are end blocks 5 to protect the table 10 against runaway out of the ends of the bed 2. Recesses 7 are formed at the outermost end faces of the end blocks 5. An operator may easily lift or carry the slider unit 1 by putting his hands on the recesses 7. Stoppers 8 of elastic body such as urethane rubber are attached to inside surfaces of the end plates 5, facing the fore-and-aft ends of the table 10, to provide buffers for protecting the table 10 from a collision against the end plates 5.

Moreover, the slider unit 1 is provided with sensor means 33 of an optical linear encoder for detecting the position of the table 2 with respect to the bed 2. The sensor means 33 includes a strip of optical linear scale 34 disposed lengthwise on an inside surface of a recess 19 sank in the bed 2 nearby a sidewise opening 32a of the magnet yoke 21. On the bottom of the recess 19 there is provided an origin mark 35, shown in FIG. 3, while limit plates 13 are arranged at the lengthwise opposing ends of the recess 19, one to each end, to define a tolerable range where the table 10 is allowed to move.

Referring to FIGS. 3 and 5 to 7, there is shown in detail a moving-coil linear motor 20 inboard the slider unit 1. The moving-coil linear motor 20 is comprised of a magnet yoke 21 of sidewise U-shaped configuration in cross section left open at any one lengthwise side thereof, the magnet yoke being arranged lengthwise of the bed 2 between widthwise opposing linear motion guide units 16, a pair of field magnets 30, 31 each of which has poles placed closely side by side in such a way that the poles alternate in polarity lengthwise, with unlike poles on either field magnet opposing directly to each other across an air gap, and a moving-coil assembly 40 supported by a pair of nonmagnetic brazen arms 43 depending from the bottom of the table 10. The nonmagnetic arms 43 are connected to the table 10 by fixing screws 47. The field magnets 30, 31 are made of rare-earth magnet such as neodymium and so on, which is high in magnetic force.

The moving-coil assembly 40 is secured at its fore-and-aft ends to the arms 43 depending from the table 10 in such a way that the assembly 40 extends at the center of the air gap 32 between the confronting field magnets 30, 31. The moving-coil assembly 40 is comprised of an iron core 41 having roughly rectangular shaped configuration in cross section and extending lengthwise in parallel with the sliding direction, and armature coils 42, eighteen coils in total, wound around the iron core 41 in the form of a flat rectangle and placed side by side along the sliding direction. The armature coils 42 are grouped into six three-phase coil sets 42a~42f, each of which includes three coils for U-, V- and W-phase, respectively. Any adjacent coil sets of 42a~42f are wound in the counter direction to each other. Thus, the coils in either coil set alternate in winding direction lengthwise of the table 10 as illustrated in FIG. 6 where the coils in any coil set opposite in winding direction to the coils in the adjacent coil sets are given the reference characters U, V and W under lines.

Figure 6:
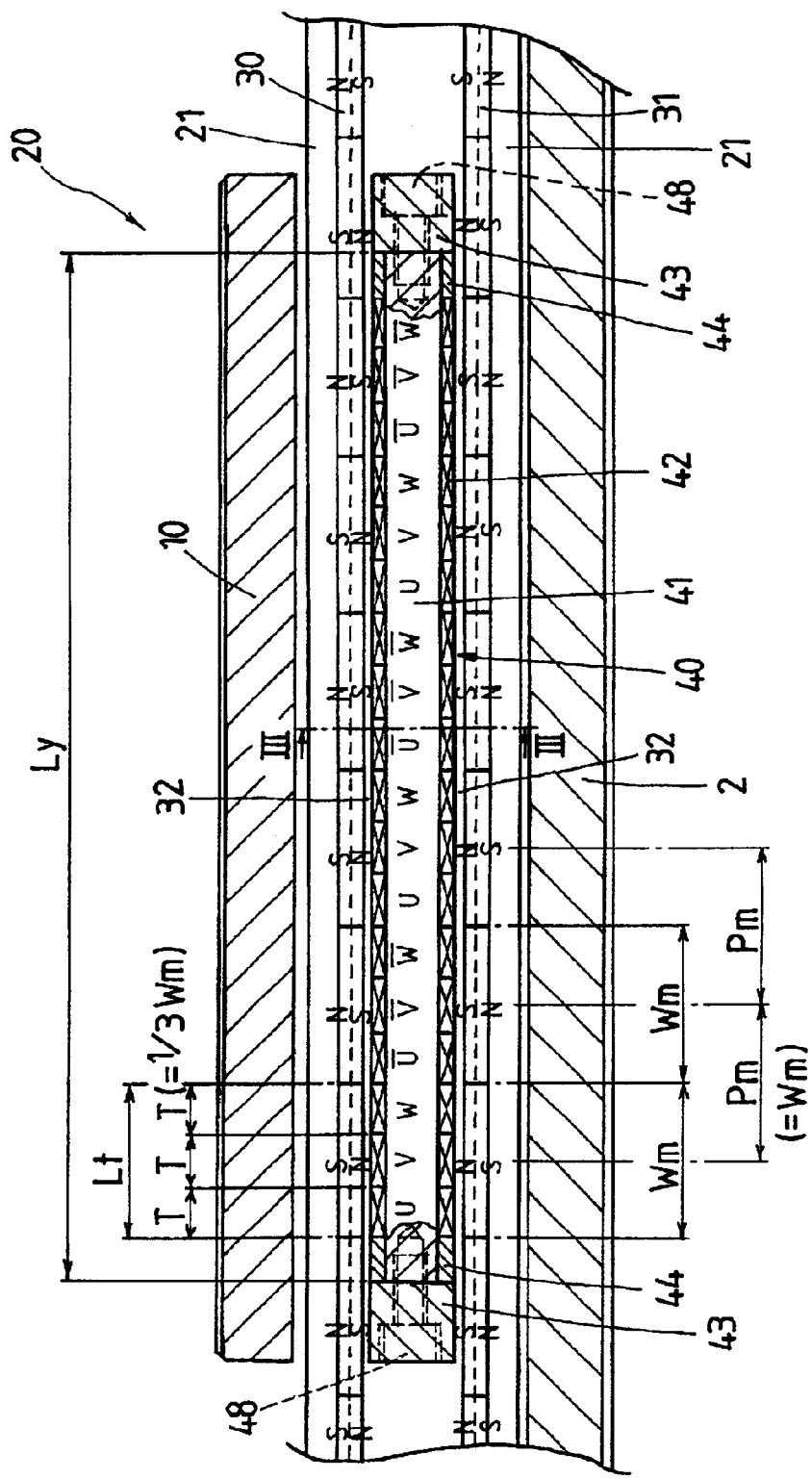
FIG. 6 is a fragmentary longitudinal section taken on the plane of the lines II—II of FIG. 2.
Figure 7:
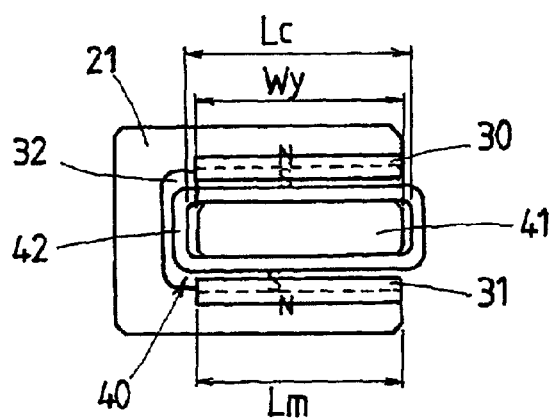
FIG. 7 is a cross-sectional elevation view taken on the plane of lines III—III of FIG. 6.

As will be understood from FIG. 6, an unlike pole pitch Fm in the field magnets 30, 31 is rendered equal with a pole width Wm: Pm=Wm, while a coil thickness T of any one armature coil 42, which is measured in the sliding direction of the table 10, is determined to keep such a relation that a thickness Lt of any one coil set is identical with the pole width: 3T=Wm. Moreover, the iron core 41, as shown in FIG. 7, is defined to keep a dimensional relation in which a length Lm of the field magnet 30, 31 measured in perpendicular to the sliding direction of the table 10 is roughly equal with a width Wy of the iron core 41: Wy≈Lm. An effective length Lc contributing to the propulsion in each armature coil 42 is made somewhat larger than the length Lm of field magnets 30, 31. As shown in FIG. 6, a length Ly of the iron core in the sliding direction of the table 10 is given by Ly=n×Wm+½ Wm, where n is an integer As the iron core is made larger in length than the overall length of the armature coils 42, spacers 44 are inserted at the fore-and-aft ends of the iron core 41, one to each end, to compensate for clearances between any one of the fore-and-aft end coils 42 and the associated supporting arm 43, which is connected to the iron core 41 by a fixing screw 48.

Figure 1:
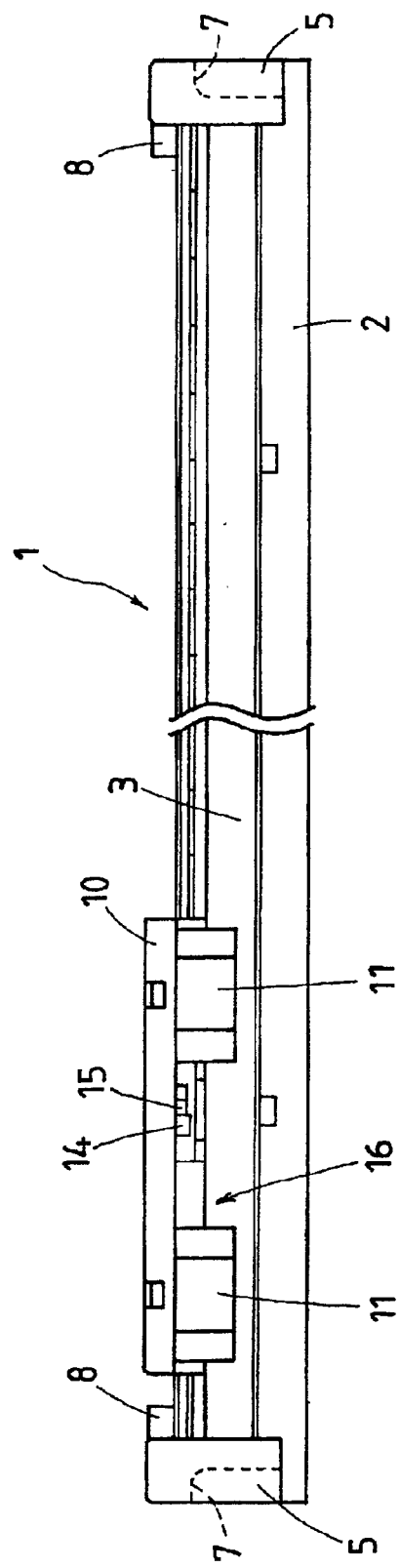
FIG. 1 is a front elevation, partially broken away, showing a preferred embodiment of a slider unit with a built-in moving-coil linear motor in accordance with the present invention.
Figure 2:
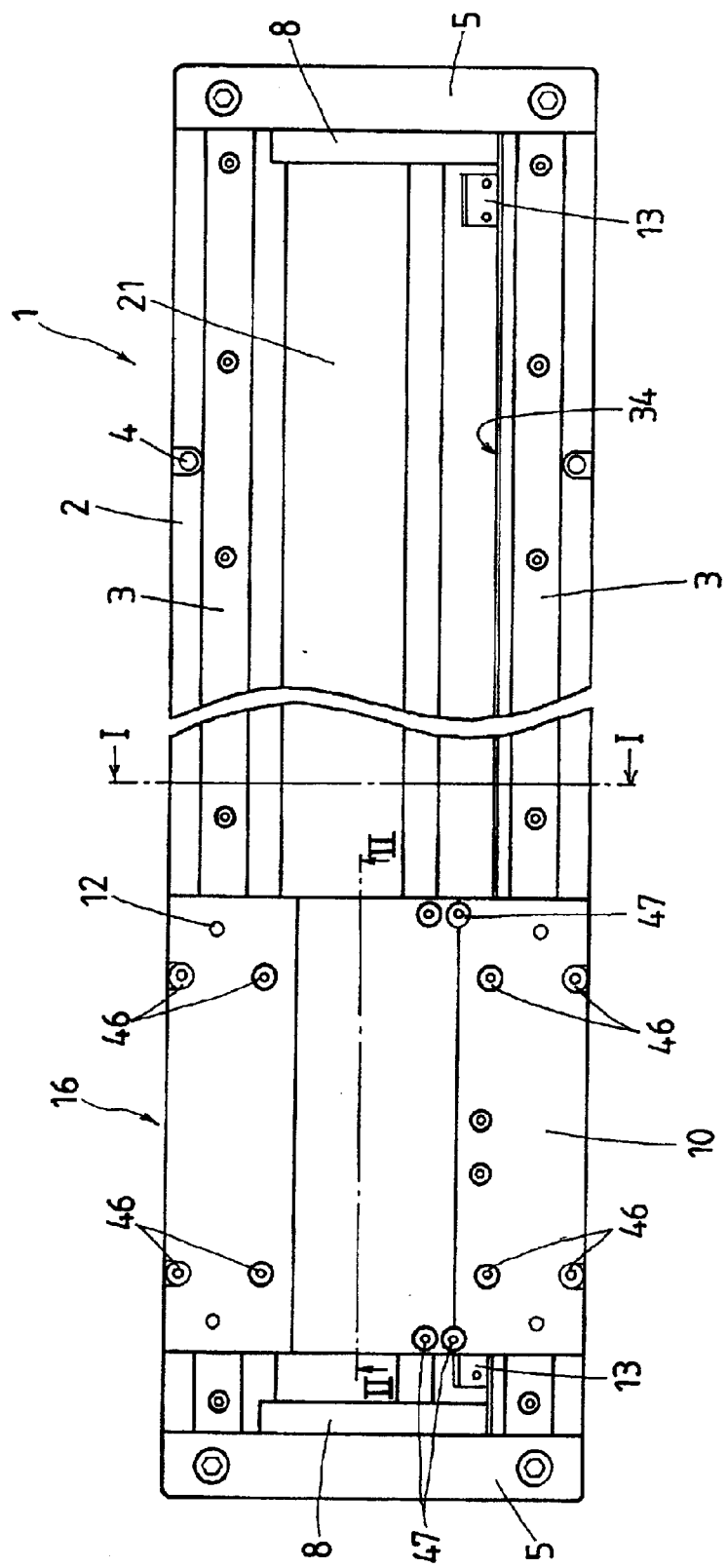
FIG. 2 is a top plan view of the slider unit illustrated in FIG. 1.
Figure 3:
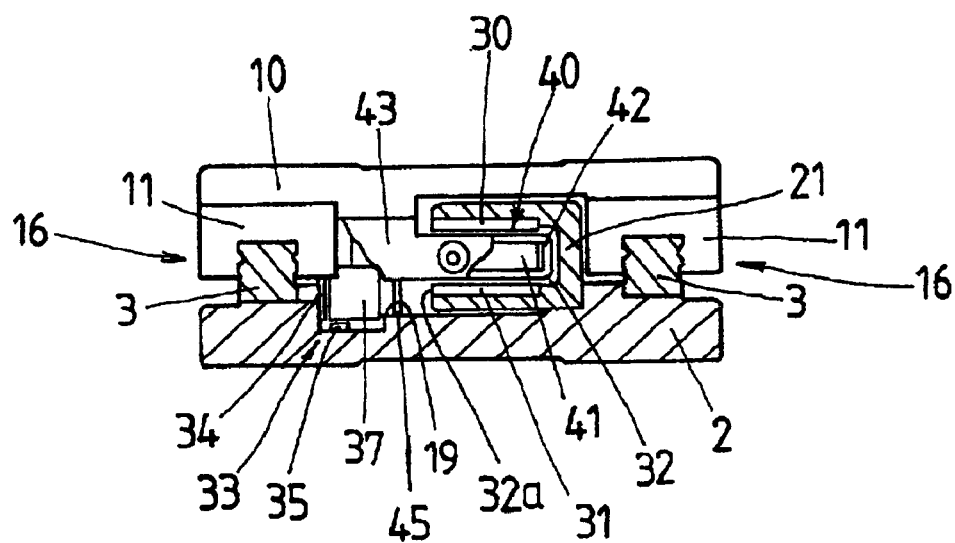
FIG. 3 is a cross-sectional view of the slider unit of FIG. 2, taken on the plane of the lines I—I of that figure including a part broken away.
Figure 4:
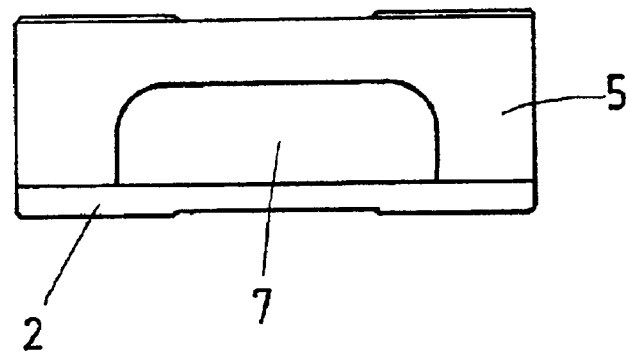
FIG. 4 is a left-side elevation of the slider unit shown in FIG. 2.
Figure 5:
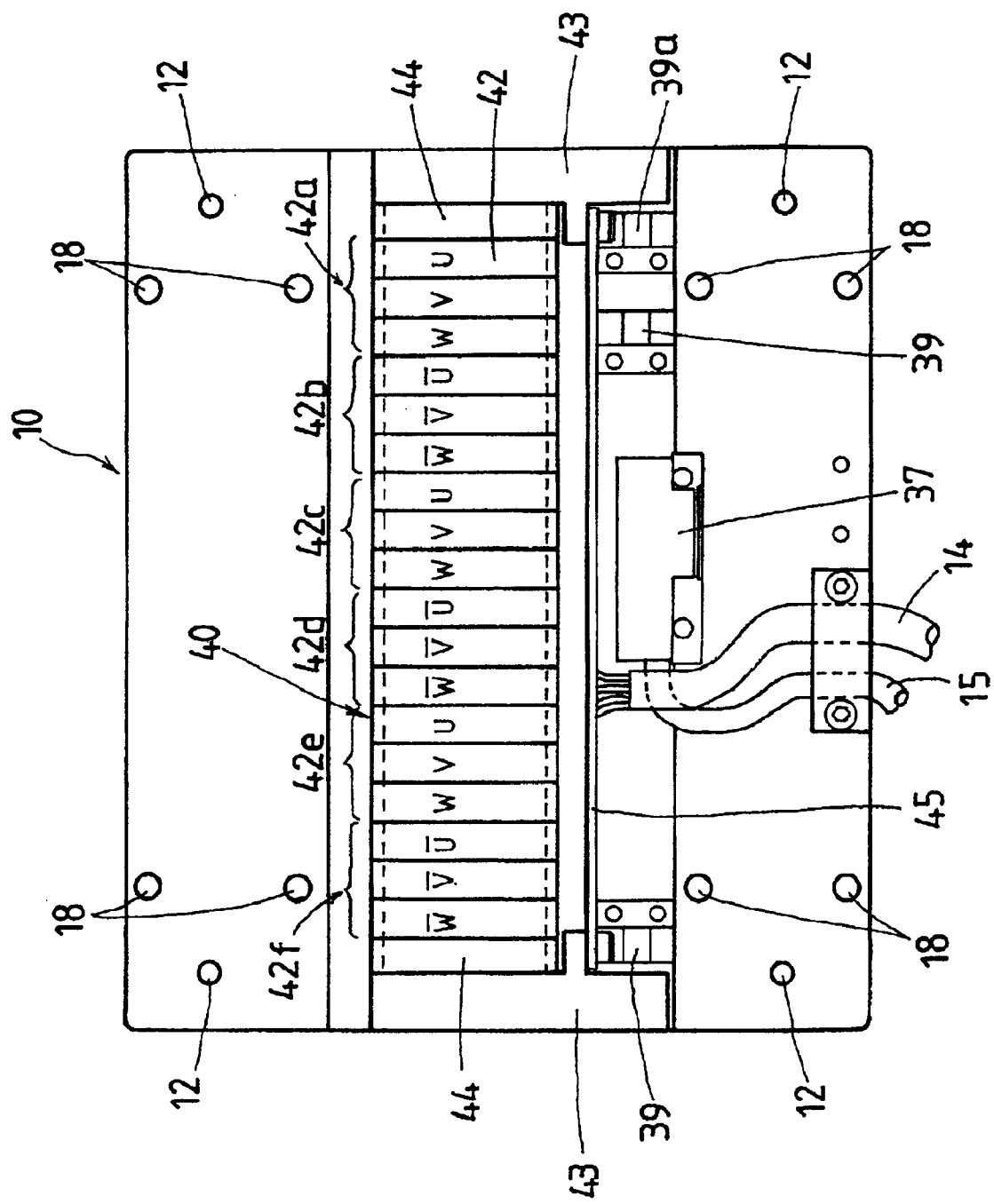
FIG. 5 is a bottom plan view of a table detached from the slider unit.

Installed underneath the table 10 confronting the bed 2, as shown in FIG. 5, is an optical sensor head 37 for providing a counterpart included in the sensor means 33 to monitor the position of the table 10 with respect to the bed 2. The optical sensor head 37 is placed at the roughly fore-and-aft midway of the table 10 in opposition to the optical linear scale 34. The optical sensor head 37, when sensing an origin mark 35 on the bed 2, will detect a position corresponding to the origin of the table 10 relatively to the bed 2. Limit sensors 39 are also attached underneath the table 10 to sense the limit plates 13 arranged at the lengthwise opposing ends of the bed 2, one to each end, to detect the limit of the stroke range of the table 10, thus keeping the table 10 from travelling over the tolerated stroke range where the table 10 is allowed to move. Nearby any one of the limit sensors 39, moreover, a before-the-origin sensor 39a is installed underneath the table 10. The before-the-origin sensor 39a is to sense any limit plate 13 ahead of the detection of the origin mark 35 by the optical sensor head 37, thereby permitting detection of the situation where the table 10 has reached just before the origin. Thus, the controller may decelerate the table 10 running for the origin, depending on a signal issued from the before-the-origin sensor 39a.

A wiring board 45 is attached underneath the table 10. The wiring board 45 has thereon a printed circuit to connect the armature coils 42, the limit sensors 39 and the before-the-origin sensor 39a to a power chord 15 and a signal line 14, which are communicated to any external instruments, thus allowing electric power supply to the armature coils 42 and signal transmission from the limit sensors 39 and the before-the-origin sensor 39a.

With the slider unit 1 constructed as stated earlier, when the armature coils 42 carry current, the magnetic flux generated so as to revolve around the coil sides of the armature coils interacts with the magnetic flux that exists always in perpendicular to the sliding direction of the table 10 between the field magnets 30, 31 and the iron core 41 confronting at its both sides the field magnets 30, 31. Thus, the armature coils 42 experience a force in the sliding direction according to the Fleming's rule, whereby the table 10 having thereon the moving-coil assembly 40 of more than one armature coil 42 and the iron core 41 is forced to move. Turning over the direction of current in the armature coils 42 in compliance with the direction of magnetic flux created by the field magnets 30, 31 allows the table 10 to move in a sliding manner to any desired position.

Figure 8:
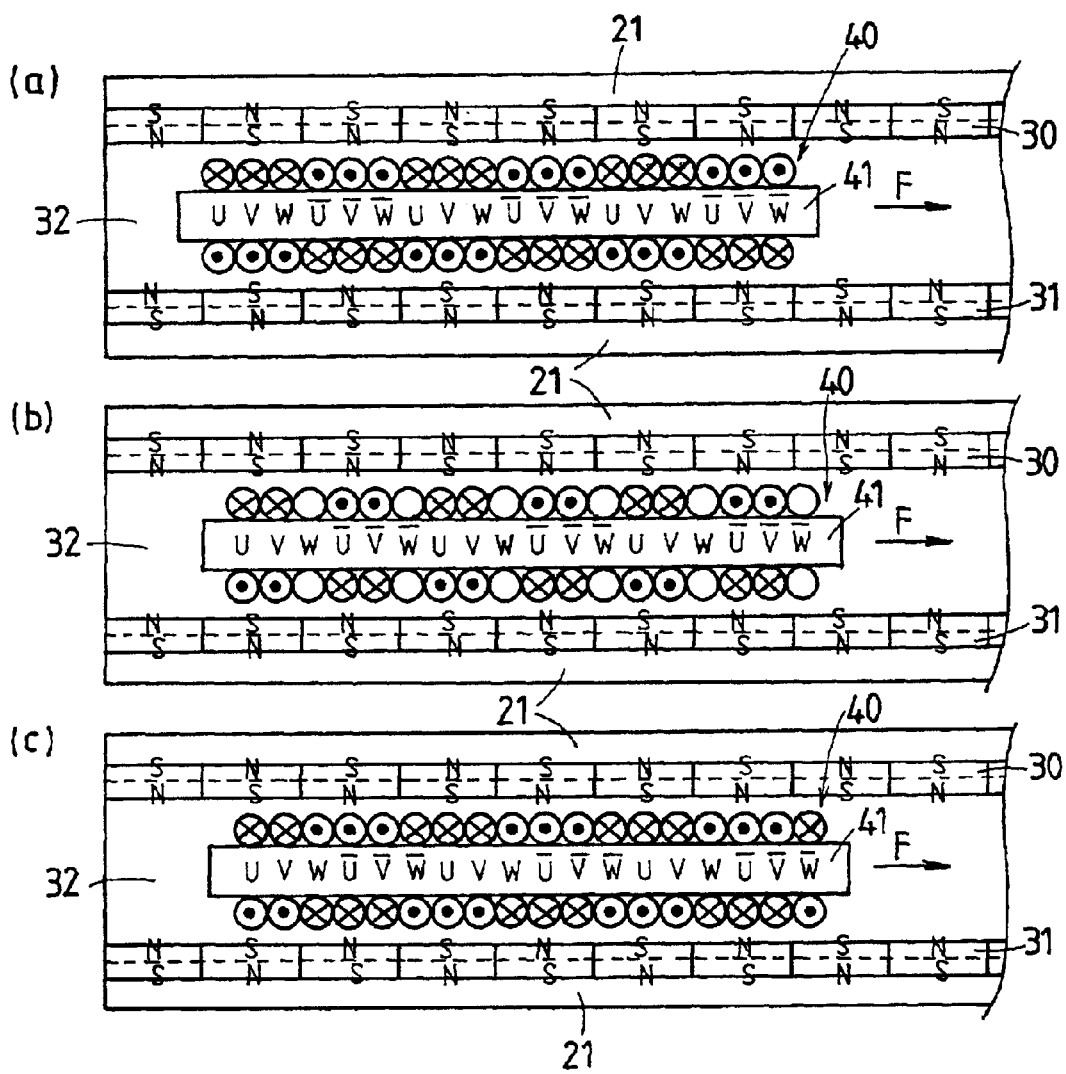
FIG. 8 is an illustration showing relations of the moving coils and field magnets to explain how the moving-coil linear motor operates.

Referring next to FIG. 8, there is shown a condition where the armature coil assembly 40 carries a current. In (a), (b) and (c) of FIG. 8, the armature coil assembly 40 is shown in conditions displaced from each other by an electrical angle of 30 degrees. With the armature coil assembly 40 in which the armature coil sets 42a~42f, each including three coils of U-, V- and W-phase, alternate on winding direction lengthwise of the table 10, the armature coil assembly 40 carries a current in either position or negative direction in compliance with the direction of the magnetic flux, thus moving rightwards viewed in the figure on the basis of the Fleming's left-hand rule. Since each coil 42 carries a current that varies sinusoidally with time, any armature coil 42 at a boundary between any two adjacent poles as shown in (b) rests to conduct the current. In contrast, other armature coils 42 will carry the current either toward reader or away from reader, thus continuing to drive the armature coil assembly 40 in the direction F. As a result, the table 10 is allowed to make the desired linear motion.

In initial conduction, controller is previously stored with information as to the unlike pole pitch Pm in the field magnets 30, 31, resolving-power of the sensor means 33, direction toward the origin, and so on. The instant the armature coils 42 carry current, the conducting position is detected and the controller starts to regulate the operation of the moving-coil assembly 40. The moving-coil assembly 40 is firstly servo-locked and then driven to a desired position found according to the detected signal representing the conducting position. When it is desired to make the origin the home position of the operation, the moving-coil assembly 40 is driven initially towards the origin mark 35. At standstill, no current flows in the moving-coil assembly 40. To get the moving-coil assembly 40 into motion, accordingly, once the table 10 is moving, the controller begins operating to return the moving-coil assembly 40 to the position where it has come to a standstill. Thus, the moving-coil assembly 40 may remain in whatever position the moving-coil assembly 40 last ceased moving. It will be understood that the controller allows the slider unit 1 to move lengthwise as well as stop moving at any desired position.

Figure 9:
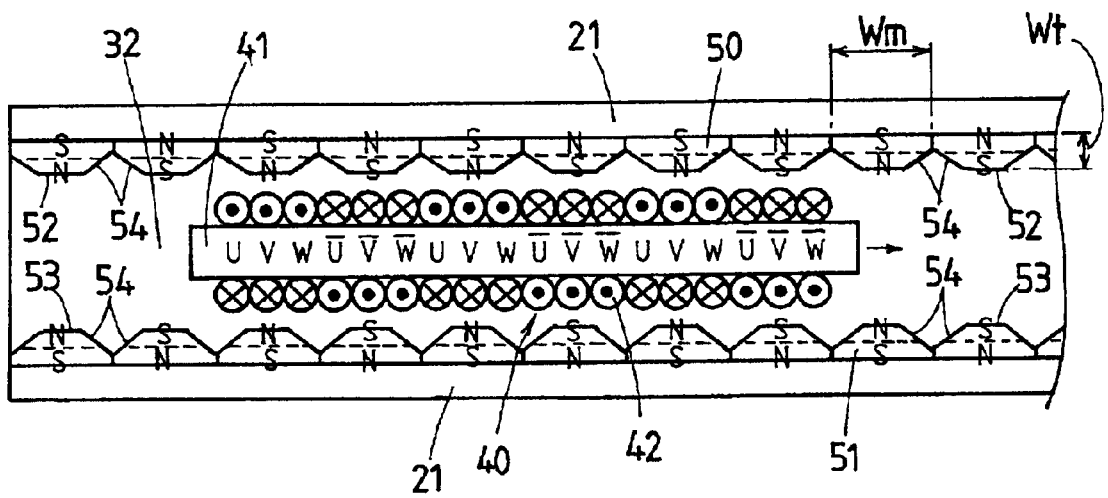
FIG. 9 is a schematic fragmentary longitudinal section showing another embodiment of the slider unit with built-in moving-coil linear motor according to the present invention.

Another embodiment of the slider unit according to the present invention will be hereinafter described with reference to FIG. 9 in which there is illustrated the cooperative arrangement of the moving-coil assembly with the field magnets in the slider unit. As the slider unit to be stated later is substantially identical in construction to the first embodiment stated earlier, rather than the configuration of the field magnets, the like reference numerals designate the components or parts identical or equivalent in function with that used in the slider unit stated earlier, so that the previous description will be applicable.

According to the second embodiment, any adjoining poles 52, 53 of field magnets 50, 51 are both chamfered off to provide skewed areas 54 at their corners coming into abutment against each other and facing the air gap 32. In detail, each pole 52, 53 tapered at its opposing corners is made by chamfering off the widthwise opposing corners, each of which is about one-third of the pole width in length and about two-thirds of the pole thickness in depth. The poles 52, 53 chamfered at 54 serve for relaxing any influence of field strength, thus providing the ideal distribution, or sinuous distribution of magnetic flux strength to realize a smooth movement of the table 10.

Figure 10:
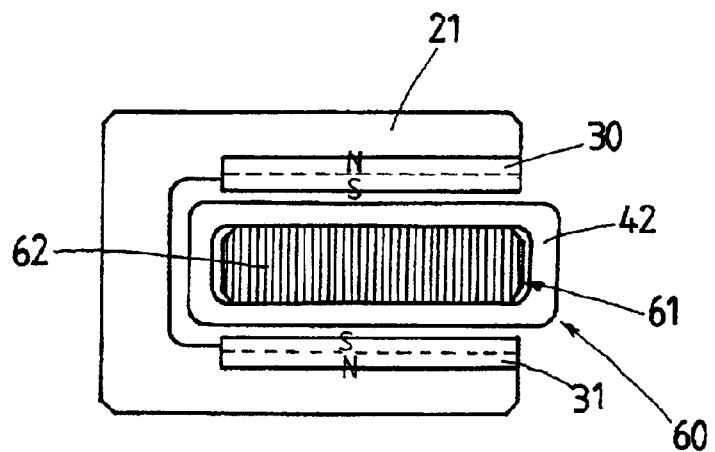
FIG. 10 is a cross-section showing a further another embodiment of the slider unit with built-in moving-coil linear motor according to the present invention.

Finally referring to FIG. 10, there is shown a further another embodiment of the slider unit according to the present invention.

As an arrangement of the field magnets 30, 31 with a moving-coil assembly 60 for the slider unit in FIG. 10 is substantially identical in construction to the first embodiment stated earlier, rather than the configuration of an iron core 61, the like reference numerals designate the components or parts identical or equivalent in function with that used in the slider unit stated earlier, so that the previous description will be applicable.

In the embodiment stated later, the iron core 61 is made of a lamination of thin steel sheets overlaid one on another. Although the iron core 41 in the first embodiment, as shown in FIG. 7, is formed in a configuration of roughly rectangular sheet in cross section, the iron core 61 in FIG. 10 is made of more than one thin steel sheet 62 arranged lengthwise in perpendicular to the paired field magnets 30, 31 and laminated in close contact relation, with an insulating layer being interposed between any two adjoining steel sheets, to form the configuration of rectangular sheet similar to the iron core 41 in the first embodiment. The iron core 61 constructed as stated just above serves well to suppress the generation of eddy current in the iron core 61 to be kept from becoming heated.

While the power capacity of the slider unit according to the embodiments stated earlier is up to 200 W, the power capacity of 100 W would be sufficient. However, the power capacity of 200 W is preferable to provide high propulsion.

What is claimed is:

1. A slider unit with a built-in moving-coil linear motor, comprising a bed supporting thereon a magnet yoke, a table movable in a sliding manner with respect to the bed, a pair of field magnets each having a plurality of poles, each pole having a pole width along the moving direction, said poles being arranged on inwardly facing surfaces of confronting sections of the magnet yoke in such a manner that poles on either field magnet alternate in polarity along a moving direction of the table and also like poles confront each other across an air gap between the field magnets, and a moving-coil assembly mounted to the table to lie in the air gap between the confronting field magnets, wherein the table is arranged for a sliding movement with respect to the bed through a linear motion guide unit, which is comprised of a guide rail mounted to the bed, and a sliding element fixed to the table, wherein the confronting sections of the magnet yoke are connected to each other on any one side of widthwise opposing sides thereof along the moving direction, wherein any adjoining poles of field magnets are chamfered off at their corners coming into abutment against each other and facing the air gap, wherein the moving-coil assembly is composed of an iron core of platy-configuration extending in the air gap along the moving direction, and at least one set of three-phase armature coils composed of three coils that are wound around the iron core in a direction intersecting the moving direction, and lying succesively in the moving direction and secured to the iron core, whereby the iron core extends through the coils, wherein the moving-coil assembly is supported by arms extending from the table through a sidewise opening left at another side of the confronting sections of the magnet yoke, wherein the moving-coil assembly is composed of more than one set of armature coils and each set of armature coils has a length in the moving direction that corresponds to one pole width in the moving direction, and wherein the iron core is formed in a rectangular platy-configuration in cross section and made longer than a combined length, in the moving direction, of the armature coils lying successively in the moving direction, the iron core having a length, in the moving direction, substantially equal to the combined length, in the moving direction, of the armature coils plus one-half of a pole width, and further the iron core is fixed at its fore-and-aft ends to the arms, whereby a current in the armature coils interacts electromagnetically with a field flux created by the field magnets to force the table moving with respect to the bed.

2. A slider unit with a built-in moving-coil linear motor constructed as recited in claim 1, wherein the iron core is made of a lamination of thin steel sheets overlaid one on another.

* * * * *